Dec. 15, 1953  J. F. CHIPMAN  2,662,994
GROUNDING AND TESTING DEVICE FOR METAL CLAD SWITCHGEARS
Filed Sept. 28, 1951  6 Sheets-Sheet 1

Fig. 1

Inventor
John F. Chipman
by Warren F. B. Lindsley
Attorney

Dec. 15, 1953          J. F. CHIPMAN          2,662,994
GROUNDING AND TESTING DEVICE FOR METAL CLAD SWITCHGEARS
Filed Sept. 28, 1951                              6 Sheets-Sheet 3

Inventor
John F. Chipman
by Warren F. B. Lindsley
Attorney

Dec. 15, 1953   J. F. CHIPMAN   2,662,994
GROUNDING AND TESTING DEVICE FOR METAL CLAD SWITCHGEARS
Filed Sept. 28, 1951   6 Sheets-Sheet 4

Inventor
John F. Chipman
by Warren, F. B. Lindsley
Attorneys

Dec. 15, 1953  J. F. CHIPMAN  2,662,994
GROUNDING AND TESTING DEVICE FOR METAL CLAD SWITCHGEARS
Filed Sept. 28, 1951  6 Sheets-Sheet 6

Inventor
John F. Chipman
by Warren F. B. Lindsley
Attorney

Patented Dec. 15, 1953

2,662,994

UNITED STATES PATENT OFFICE 2,662,994

GROUNDING AND TESTING DEVICE FOR METAL CLAD SWITCHGEARS

John F. Chipman, South Weymouth, Mass., assignor to Allis-Chalmers Manufacturing Company, Milwaukee, Wis.

Application September 28, 1951, Serial No. 248,749

10 Claims. (Cl. 317—113)

This invention relates to grounding and testing devices for metal clad switchgear and more particularly to interlocking devices and system used thereon for adequately protecting the operating personnel.

This grounding and testing device is not designed for the interruption of an electric circuit but is an integral unit complete with relays, auxiliary switches and safety interlocks and is readily interchangeable, for purposes of test, with the breakers normally used in metal clad switchgear. After proper settings have been made, this grounding and testing device can, by means of the circuit breaker's lifting gear, be raised in place in the breaker cubicle and serve, with maximum safety to operators and servicemen, as a vehicle for grounding either the bus or line terminals or performing a phasing out, high potential, or current test on the power lines. This grounding and testing device has been provided with both mechanical and electrical interlocks for safeguarding the operating personnel during the testing operation.

In accordance with the invention claimed, a grounding and testing device is provided with new and improved interlocking devices and systems which prevent access to, or make accessible, test terminals only after a proper sequence of steps has been traversed in the setting of the interlocking devices and circuit making and breaking contacts.

It is, therefore, one object of the present invention to provide a new and improved interlocking system for grounding and testing devices for electric switchgear which makes accessible certain test terminals only after a proper sequence of steps has been traversed in the setting of certain interlocking devices.

Another object of this invention is to provide new and improved interlocking means.

A further object of this invention is to provide new and improved interlocking means which cooperate with each other in a novel way to protect operating personnel from the dangers of the power circuit being tested.

Objects and advantages other than those above set forth will be apparent from the following description when read in connection with the accompanying drawings, in which.

Figure 1:
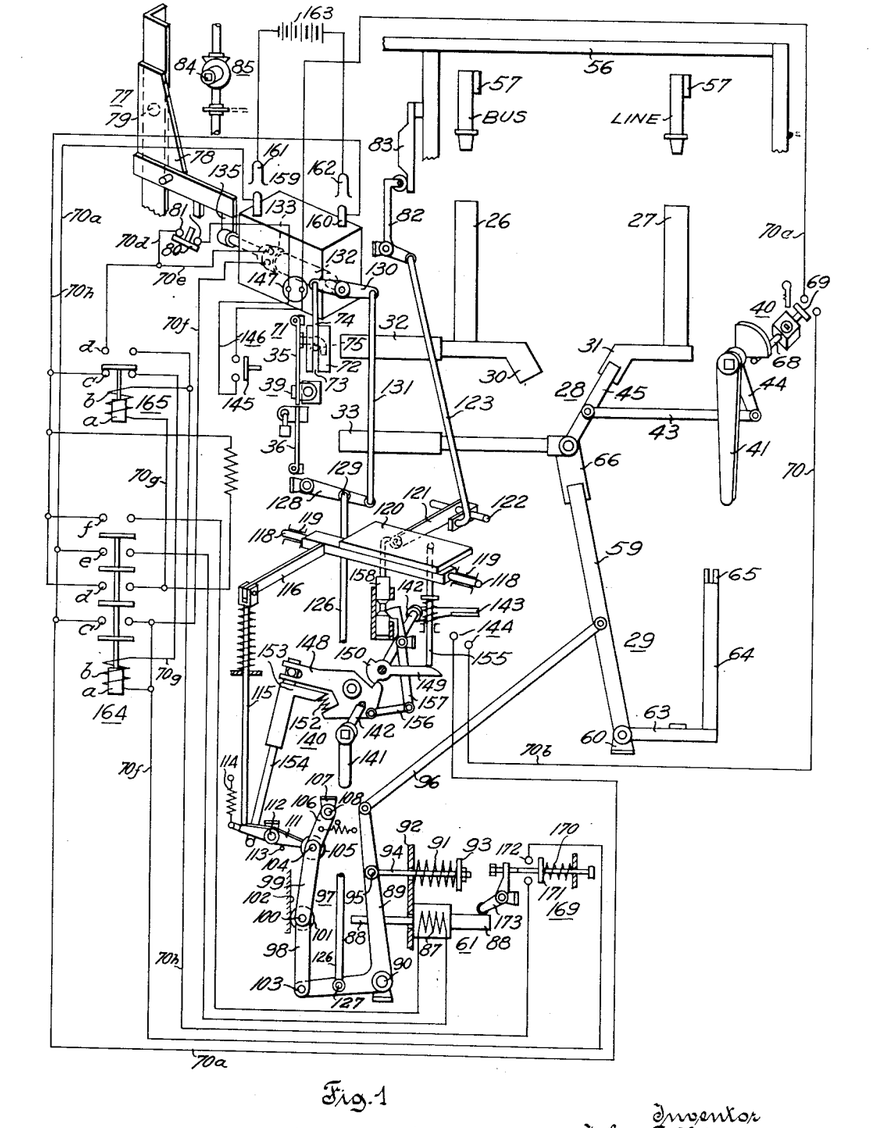
Fig. 1 is a diagrammatic representation of the grounding and testing device and the electrical control system thereof employing the present invention.

Referring more particularly to the figures of the drawing, Fig. 1 shows diagrammatically the grounding and testing devise and an electrical control system therefor, while Figs. 2 to 21, inclusive, illustrate the structural elements of this particular device.

Figures 2, 3, 4, 5:
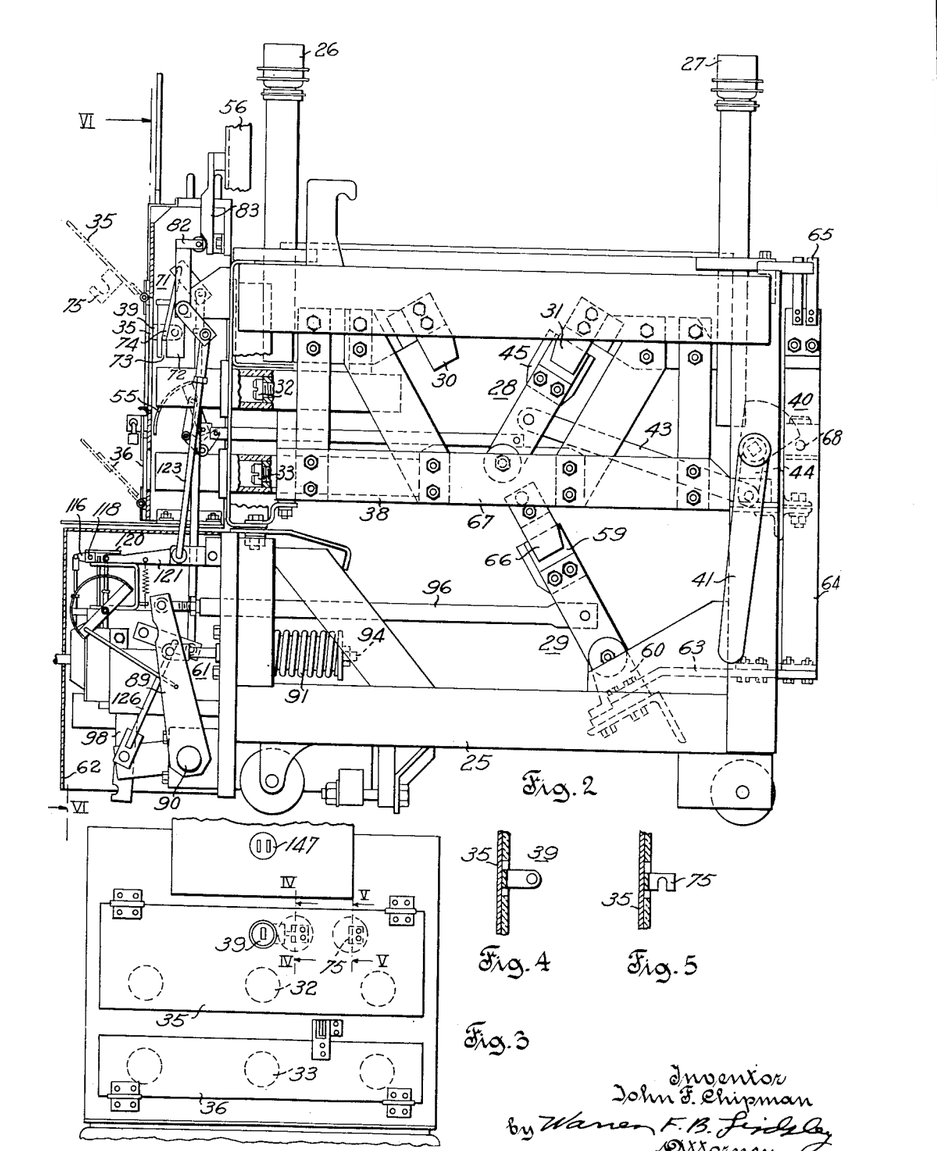
Fig. 2 is a side elevation partly in section of the grounding and testing device with the side panel removed.
Fig. 3 is a partial front view of the grounding and testing device illustrated in Fig. 1 with the test terminal doors in the closed position.
Fig. 4 is a section through the upper door of Fig. 3 along the line IV—IV showing the latch for the interlock in the unlocked position.
Fig. 5 is another section through the upper door of Fig. 3 along line V—V showing another latch portion which is controlled by the tripping mechanism.
Figure 6:
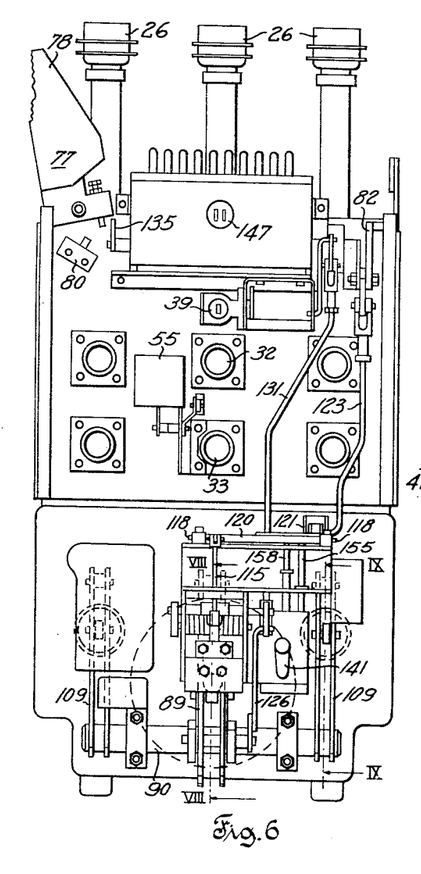
Fig. 6 is a view in section of the device taken along line VI—VI to show the terminal connections; front panel and operator covers also omitted.
Figure 7:
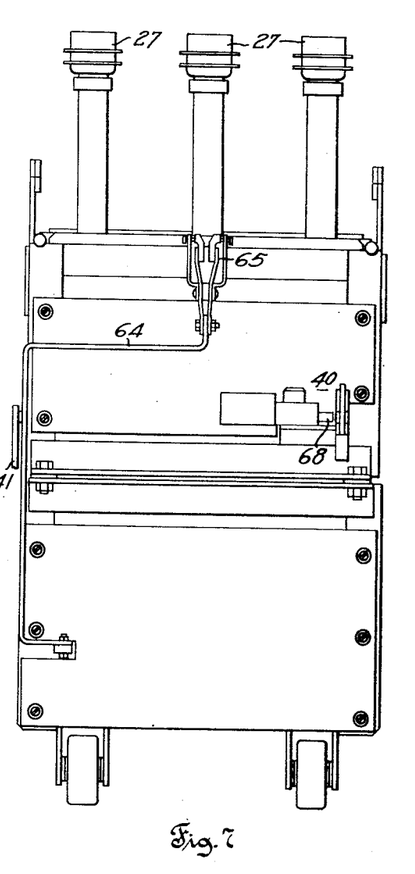
Fig. 7 is a rear elevational view showing the grounding terminals and the interlock for the selector switch.
Figure 8:
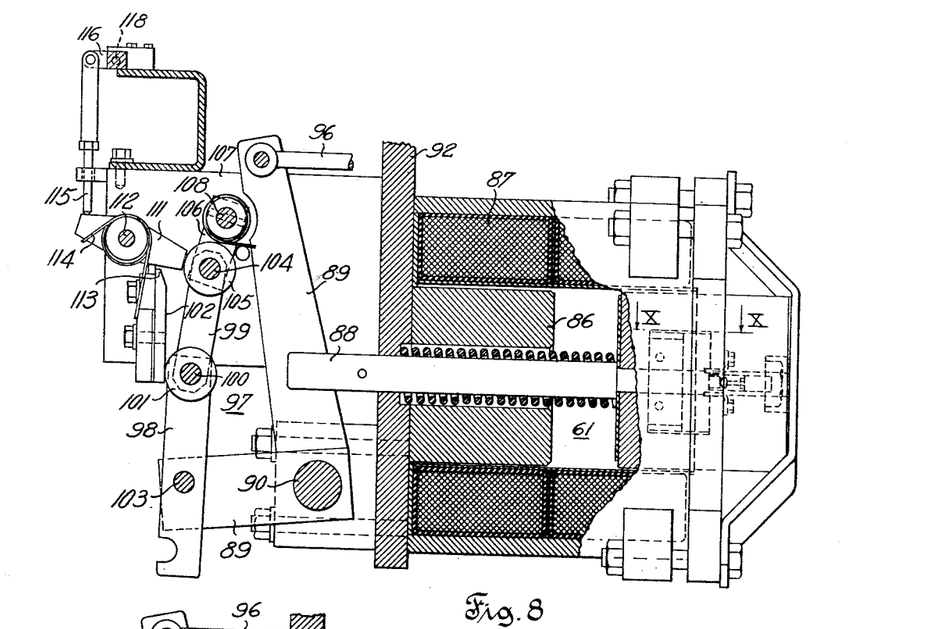
Fig. 8 is a sectional view of the solenoid operator, the section being taken along the line VIII—VIII of Fig. 6.
Figures 9, 10:
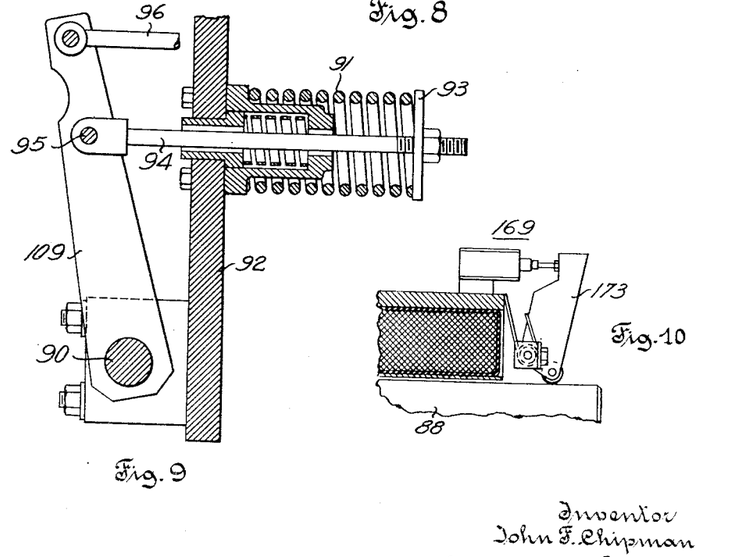
Fig. 9 is a sectional view of the spring loaded crank arm, the section being taken along the line IX—IX of Fig. 6.
Fig. 10 is a section taken along line X—X of Fig. 8 illustrating the limit switch controlled by the armature of the solenoid operator.
Figure 11:
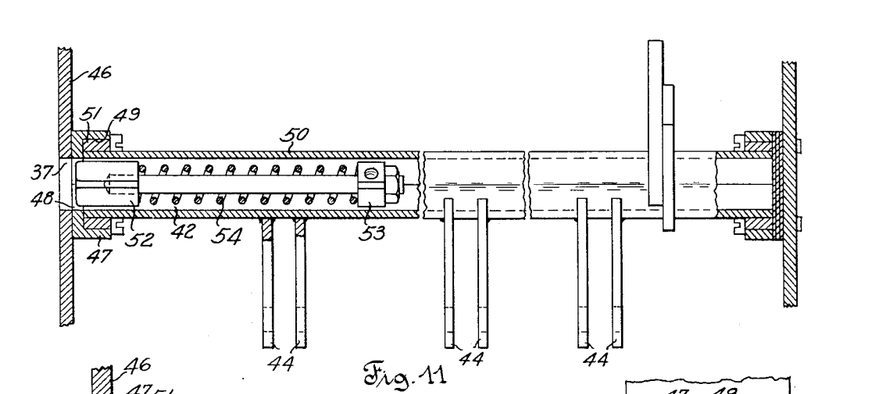
Fig. 11 illustrates the selector switch operating shaft and cam for an interlock controlling the movement of the grounding movable selector switch arm.

Although, in general, grounding and testing devices of the type herein considered are provided with a plurality of similar switch elements or pole units to be used in the several conductors of a polyphase electric circuit as shown in Figs. 3, 6 and 7, the device is described in detail as if it were of the single pole type.

As shown in Figs. 2, 3, 6 and 7, the grounding and testing device basically comprises a structural steel frame 25 supporting vertically mounted bus terminal stud 26 and vertically mounted line terminal stud 27, a double-throw selector switch 28 and a magnetically operated grounding switch 29.

Studs 26 and 27 are provided with stationary contact terminals 30 and 31. Test terminal 32 is connected to lower end of stud 26, and 33 to the common hinge point of the selector switch. These horizontally arranged test terminals extend to the front of the steel frame 25 and form test receptacle which are accessible upon opening of covers 35 and 36.

A key interlock 39 is arranged to lock the cover 35 in front of the top test terminal 32. The cover 36 over the bottom test terminal 33 can be opened at any time but is equipped for independent padlocking.

A key interlock 40 is provided for locking the selector switch 28 in line position during ungrounded testing. The key, which is interchangeable, with interlock 39, is captured in interlock 40 when the selector switch is in bus position thus preventing opening of cover 35 with the key until switch 28 is moved from bus to line position and bolt 68 on interlock 40 is extended to lock selector switch 28 in line position and open contact 69 making grounding contact 59 inoperable.

Figures 12, 13, 14, 15, 16:
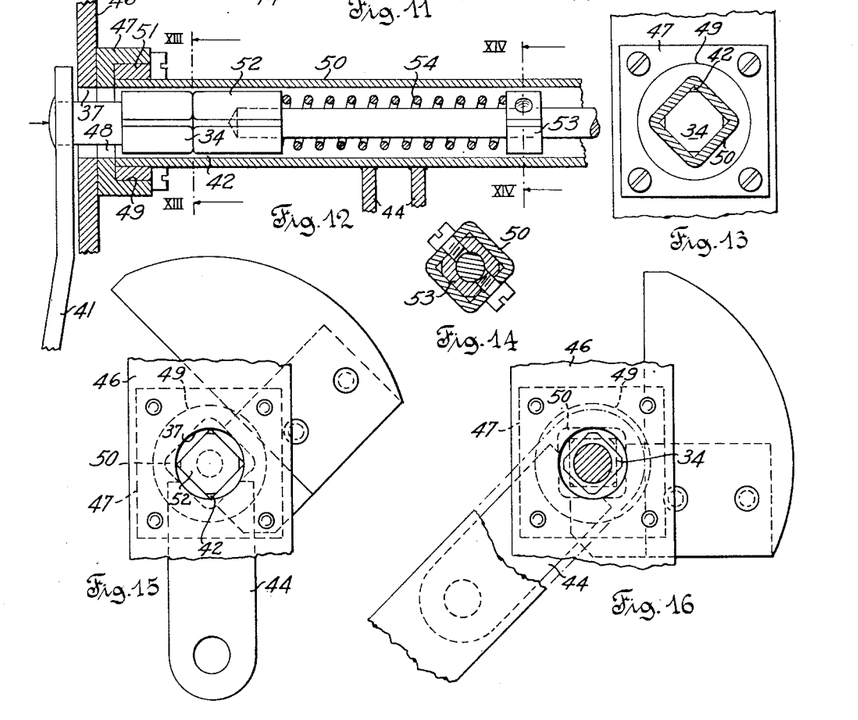
Fig. 12 is an enlarged partial view of the selector switch and crank shaft with the crank handle shown in operative position.
Fig. 13 is a cross sectional view through the crank shaft of Fig. 12 and taken along the line XIII—XIII.
Fig. 14 is a cross sectional view of the crank shaft shown in Fig. 12 along the line XIV—XIV and showing the locking assembly secured to the crank shaft.
Fig. 15 is a left hand end view of the structure illustrated in Fig. 12 without the operating handle.
Fig. 16 is a view similar to Fig. 15 but distinguishing therefrom by showing the crank handle inserted in the device and rotated 45 degrees to show that the square portion of the handle no longer registers with the square opening of the bearing plate.
Figures 17, 18, 21:
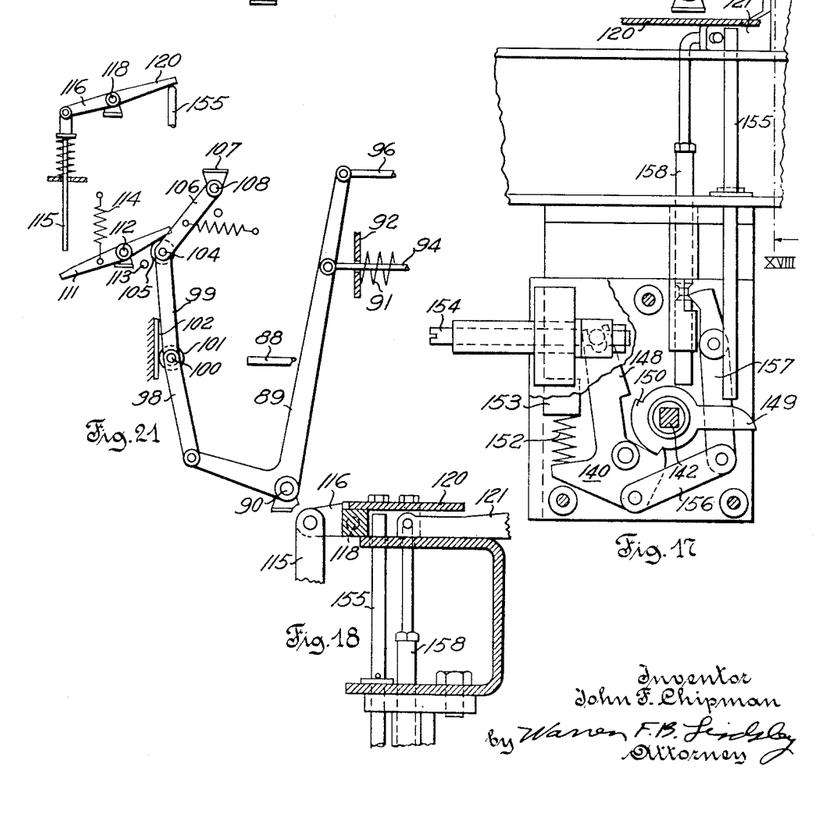
Fig. 17 is an enlarged detailed view of the trip latch releasing mechanism.
Fig. 18 is a sectional view of the operating rocking shaft, the control switch rod and the vertical lift interlock latch release rod.
Figs. 19, 20 and 21 are diagrams of the operator linkage for a circuit breaker in open, closed, and trip free positions, respectively.
Figure 19:
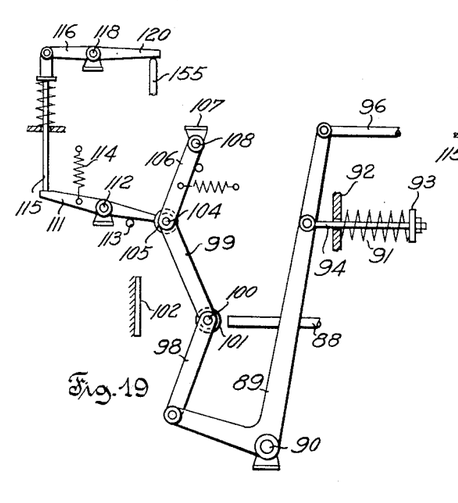
Figure 20:
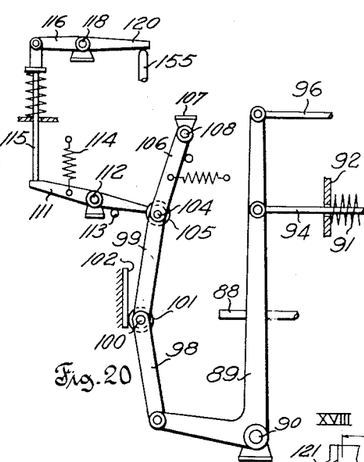

The double throw selector switch 28 may be moved between two circuit controlling positions, namely, from line to bus position or vice versa when bolt 68 is withdrawn (key held) by movement of a handle 41 when mounted in a socket 42 (shown in Fig. 12). Handle 41 is pivotally connected by a lever 44 and a pivotally mounted link 43 to a selector switch contact blade 45. Blade 45 is pivotally mounted in insulated relation on stationary conductive member 67 which in turn is mounted on support bar 38.

As shown in Figs. 11 to 16 of the drawings, handle 41 fits through a clearance hole 37 in frame 46 into a substantially square opening 48 in a housing 47. Secured to frame 46 is a housing 47 providing a substantially square orifice 48 and a cylindrically shaped opening 49. A square tubular housing 50 forming a socket 42 is interlocked with a sleeve 51 which is rotatably mounted in the cylindrically shaped opening 49. Within housing 50 is mounted a piston 52 biased by a spring 54. Spring 54 is held at one end by means of a plug 53 held by set screws within the housing 50. Piston 52 is free to move along opening 42 in housing 50. When handle 41 is removed with selector switch 28 in full contact in line or bus position, piston 52 enters rectangular opening 48 thereby locking selector switch 28 in the selected position.

The handle 41 having a square portion engaging member 34 may be inserted through opening 48 in housing 47 and into the socket 42 in either line or bus position. At that time the opening 48 in housing 47 and in socket 42 in housing 50 are in registry and handle 41 may be inserted through the opening 48 and into socket 42 to compress spring 54 biasing piston 52 and to interlock with housing 50. Upon rotation of housing 50 by handle 41, lever 44 and link 43 rotate therewith to actuate the selector switch 28 to either bus or line positions.

The handle 41 may be removed from socket 42 in either bus or line position only, because the square portion of handle 41 registers with the square orifice 48 of socket 47. In any intermediate position, handle 41 cannot be removed from socket 42 because the square opening of socket 42 does not register with the square orifice 48 of socket 47.

Grounding switch 29 comprises a blade contact 59 pivotally mounted in conductive connection with frame 25 on a support 60 arranged at the bottom and back end of frame 25. Contact 59 is arranged to be actuated into a circuit controlling grounding position by a solenoid operator 61 which is mounted on the lower front section of frame 25 and shielded from operating personnel by a sheet metal cover 62. Grounding contact blade 59 is connected to the grounding structure of the test cubicle through a conductor 63, a conductor 64, and finger contacts 65. The movable grounding contact blade 59 cooperates with a stationary grounding contact 66 to form an electrical connection between the ground of the frame structure 25, an insulated conductive member 67 (see Fig. 2), and the selector switch contact blade 45.

Selection of test terminal stud 26 or 27 to be grounded individually through grounding contacts 59 and 66 may be made by proper movement of selector switch handle 41.

Key interlock 40 controls the movement of selector switch handle 41. Interlock 40, as shown in Fig. 1, comprises a movable bolt 68 with an insulated contact bar 69 mounted on one end thereof. Contact bar 69 makes and breaks an electric control circuit 70 upon predetermined movement of bolt 68. In one position of bolt 68 called bolt withdrawn position, line or bus setting of selector switch contact blade 45 is possible and contact bar 69 closes a break in the circuit 70 which controls the operation of the solenoid operator 61. Operator 61 actuates the grounding contact blade 59. With interlock 40 in its bolt withdrawn position, the key is held in the interlock 40, thus making it impossible to use that key to unlock interlock 39 and thereby expose the bus test terminal 32.

With the selector switch contact blade 45 in line position, interlock 40 may be turned to the bolt extended position which locks the contact blade in line position.

When interlock 40 is in the bolt extended position contact bar 69 opens the control circuit 70 to prevent closure of the grounding contacts 59 and 66 by the solenoid operator 61 and the key is released from interlock 40 for use in unlocking the front interlock 39.

Interlock 39 is mechanical in nature and acts to lock the cover 35 closed over the bus test terminals. The key is held in interlock 39 when cover 35 is open and cover 35 must be locked closed in order to free the key for use in interlock 40.

Another independent interlock 71 is provided on the bus test terminal cover 35 which comprises a guiding member 72 providing a slot 73 therein which is engaged by a rod 74. Rod 74 is controlled by the mechanism which actuates the grounding contacts and enters slot 73 and a catch 75 provided on cover 35 to prohibit opening of cover 35 when the grounding contacts 59 and 66 are closed.

An elevating mechanism interlock 77 is provided near the upper front left hand corner of frame 25. This interlock comprises a pivotally mounted arm 78 arranged to move from a left or outboard position to a right or inboard position. When the arm 78 is in the left or outboard position the grounding and testing device cannot be raised or lowered in the cubicle because the pivotally mounted arm 78 forming a part of interlock 77 covers a crank hole 79 in the test cubicle through which a crank handle must be inserted for the raising or lowering operation. The movable arm 78 is associated with a movable contact 80 which makes contact with a pair of stationary contacts 81. Contacts 81 form a break in the electric circuit 70 which controls the solenoid operator 61.

With the grounding and testing device out of the cubicle 56 the interlocking arm 78 may be moved to the right and the test device may be moved into the cell and elevated. With interlock arm 78 in extreme right position, electrical contacts 80 and 81 are separated thereby preventing closing of the grounding contacts 59, 66. After the testing and grounding device is in fully elevated position, interlock arm 78 is manually moved to the left, thereby closing contacts 80, 81 in the electric circuit 70 and also physically preventing insertion of the elevating crank to lower the test device in the cubicle. With the test device in elevated position, finger contacts 65 connect the grounding contacts 59 and 66 to a positive ground bus in the test cubicle 56.

Though normally impossible due to action of elevating mechanism interlock 77, if an attempt is made to raise or lower the grounding and testing device in a cell or cubicle with the grounding contacts 59 and 66 closed an interlock bell crank 82 indirectly connected to the grounding contact tripping mechanism, will follow along a cam 83 supported in the cubicle structure and trip open the grounding movable contact 59 before primary contacts 26 and 27 can engage or disengage the cooperating contacts of the cubicle.

The solenoid operator 61 and associated mechanism as shown in Figs. 1, 8 to 10 and 17 to 21, inclusive, comprises a core 86, a coil 87, spring biased plunger 88, a bell crank 89 pivotally mounted at 90 and a spring 91 arranged to be compressed upon closing of the grounding contacts 59, 66 and to separate the grounding contacts during an opening operation. Spring 91 is compressed between a frame 92 and a collar 93 secured to one end of a connecting rod 94. The other end of rod 94 as shown in Fig. 1 is pivotally connected to bell crank 89 at a point 95. A connecting link 96 completes the force transmitting structure between solenoid operator 61 and the movable grounding contact blade 59.

An over center toggle 97 comprises an arm 98 and another arm 99 pivotally connected at a point 100 by a pin supporting a roller 101 which rides along a frame 102. Arm 98 is pivotally connected at a point 103 to bell crank 89 and arm 99 is pivotally connected at a point 104 by a roller 105 to another arm 106. Arm 106 is pivotally connected to a frame structure 107 at a point 108.

Spring biased plunger 88 upon energization of coil 87 engages toggle 97 and forces it to an over center position thereby rotating bell crank 89 counterclockwise to close the grounding contacts 59, 66.

Toggle 97 is held in over center position by a trip latch 111 which is pivotally mounted at a point 112 and biased against a stop 113 by spring 114.

Latch 111 may be rotated counterclockwise to release the over center toggle 97, thereby causing the grounding contacts 59, 66 to separate, by a spring biased probe 115 which is actuated downward by an arm 116. Arm 116 is secured to a rotatable rod 118 mounted in bearings 119. A plate 120 is secured to rod 118 and forms an integral part thereof. Plate 120 may be actuated counterclockwise either by an arm 121 which is pivotally mounted on a rod 122, or by rod 155 through action of control switch mechanism 140. Rod 122 is mounted for rotation about its longitudinal axis.

Arm 121 is actuated in a clockwise direction by a lever arm 123 pivotally connected to bell crank 82. Upon rotation of bell crank 82 upon the elevation or lowering of the test device in the cubicle, lever arm 121 rotates clockwise and lifts plate 120 to rotate it counterclockwise. Rod 118 is caused to rotate counterclockwise by plate 120 and by its movement actuates arm 116 which forces probe 115 downward. Probe 115 rotates latch 111 counterclockwise to release roller 105 causing the point 104 to move clockwise and the bell crank 89 to rotate clockwise to separate the grounding contacts 59, 66.

A link 126 is connected to bell crank 89 at a point 127 and to a pivotally mounted arm 128 at a point 129. One end of arm 128 is connected to a rotatable arm 130 by a link 131. Arm 130 is mounted on the end of a drum 132. Drum 132 is mounted for rotation about its longitudinal axis. Drum 132 has a conductive metallic strip 133 mounted thereon which makes and breaks an electric circuit upon rotation thereof. Attached to drum 132 at the left end thereof is an arm 135 which mechanically blocks elevating mechanism interlock 77 in its left or outboard position when the grounding contacts 59, 66 are engaged. Arm 130 upon counterclockwise rotation thereof actuates rod 74 downward so that its hooked end moves out of catch 75 thereby unlocking cover 35, except for action of interlock 39.

A control switch mechanism 140 is provided for manually controlling the electric control circuit 70 and for tripping open the grounding contacts 59, 66 manually when so desired. Control switch mechanism 140 comprises a detachable handle 141 mounted on the front of the grounding and testing device for rotating a rod 142 either clockwise or counterclockwise.

By rotating handle 141 clockwise to closed position, rod 142 is rotated clockwise about its longitudinal axis and a switch arm 143 mounted thereon rotates clockwise to close a break 144 in the control circuit 70. Control circuit 70 may then be energized by pushbutton switch 145 arranged at the end of a rubber cable 146 which is plugged into a receptacle 147 mounted on the front of the test device. An irregularly shaped body member 148 is rotatably mounted so as to be actuated by a cam 150 mounted on rod 142. Member 148 is biased in a counterclockwise direction by a spring 152 mounted between member 148 and a fixed member 153. As more clearly shown in Fig. 17, in the clockwise position member 148 actuates a rod 154 to a position where it blocks the rotation of trip latch 111 and prevents a trip free operation of the grounding contact operating mechanism. Rod 154 remains in that position to block the movement of trip latch 111 whenever the control switch handle 141 is in closed or neutral position. Thus, tripping of the grounding contacts can be accomplished only by turning the control handle 141 to trip position or by the action of the vertilift interlock 82, which is shielded against manual operation.

By rotating handle 141 counterclockwise to trip position, arm 149 rotates counterclockwise and cam 150 rotates member 148 which moves rod 154 to unblock and disengage trip latch 111. Upon further rotation of arm 149 counterclockwise, it engages a spring biased rod 155 which pushes plate 120 clockwise to trip open the grounding contacts 59, 66.

Attached to member 148 by a pivotally mounted link 156 is a latch 157 which is actuated by a piston like member 158 in response to movement of arm 121. Member 158 is provided with an arm which engages with arm 121. Thus, clockwise movement of arm 121 acts through latch 157 and link 156 to rotate member 148 clockwise and thus unblock latch 111 to provide for tripping free solenoid operator 61 upon actuation of vertilift interlock 82 on raising or lowering device in cubicle.

In order to electrically control the grounding and testing devices, relays and auxiliary switches have been provided for integrating the electrical system into an operating unit.

When the test device is raised into the test cubicle a pair of probe contacts 169, 160 engage a pair of stationary contacts 161, 162. Contacts 161, 162 are connected to a suitable source of auxiliary power 163 for actuating the control circuits. A solenoid operated relay 164 comprising an armature 164a and a coil 164b controls a plurality of electric circuits by movement of its armature to close or open a plurality of contacts 164c, 164d, 164e and 164f.

Another solenoid operated relay 165 comprising a core 165a, a coil 165b, controls contacts 165c and 165d and the control circuits associated therewith.

A switch 169, comprising a spring biased movable armature 170, a contact bar 171 mounted on the armature, a pair of stationary contacts 172, and a pivotally mounted bell crank 173 having abutting contact engagement with armature 170 on one end thereof and a rolling contact engagement with plunger 88 of the solenoid operator at the other end thereof, is provided for controlling the energization of relay 165. When the solenoid operator is energized and plunger 88 is moved to the left to move the overcenter toggle 97, the bell crank 173 rolls off of plunger 88 at a predetermined point and the spring biased armature closes contacts 171 and 172.

The operation of the grounding and test device will be explained step by step for each of the types of test it is capable of performing, namely, grounding test, phasing out test, potential test and current test.

Grounding test

With the grounding and testing device out of the test cubicle, remove the key from the interlock 39 with cover 35 closed. Insert the key in interlock 40 and turn to bolt withdrawn position, thereby unlocking the double throw selector switch 28 and closing the break in the control circuit 70 by contact bar 69. The key is then captured in interlock 40 and cover 35 is locked closed making bus terminal 32 inaccessible. Selector switch 28 may then be actuated to line or bus position.

Insert selector switch handle 41 in socket 42 and rotate the handle 41 to actuate selector switch contact blade 45 to bus or line position as desired. In bus position contact blade 45 engages stationary contact 30 and in line position contact blade 45 engages stationary contact 31. The position of the blade contact 45 is noted by an indicator 55 at the front of the grounding and testing device, or by visual inspection through a transparent cover on top of the device. The selector switch handle 41 must be removed from socket 42 prior to inserting the grounding and testing device in the test cubicle and it can be removed only when the contact blade 45 is in complete engagement with either stationary contact 30 or stationary contact 31.

With the grounding contacts 29 open, the elevating mechanism interlock 77 is moved to inboard position uncovering hole 79 and separating contacts 80, 81 in the closing control circuit 70. A crank is inserted in hole 79 and into the socket 84 of the elevating mechanism 85 and the grounding and testing device is elevated into the test cubicle. If an electrical operating elevating gear were used, the interlock 77 when moved to the inboard position would close a switch to energize the electrically operating gear control circuit.

With the grounding and testing device raised into position in the test cubicle, contacts 160 and 162 and contacts 161 and 159 engage. The crank is removed and the elevating mechanism interlock 77 is manually moved to the left to its outboard position thereby covering hold 79 into which the manual elevating gear crank was inserted and preventing lowering of the grounding and testing device from the cubicle. When the grounding contacts 59, 66 are closed, elevating mechanism interlock 77 is mechanically blocked in outboard position by arm 135. With the grounding and testing device in elevated position finger contacts 65 connect the device to a positive ground bus in the test cubicle. Though normally impossible due to action of elevating mechanism interlock 77, if an attempt is made to raise the grounding and testing device in the cubicle with the grounding contacts 59, 66 closed, interlock bell crank 82 follows cam 83 supported in the cubicle structure and trips open the grounding blade contact 59 before primary contacts 26 and 27 can be elevated into striking distance of the engaging contacts 57 in the cubicle.

Before grounding any circuit a check should be made to see that the circuit is not alive. For this purpose, the lower set of test terminals 33 (line test terminals) are accessible behind cover 35 by the removal of a padlock. If a check of these terminals indicates no potential, it is safe to proceed with the grounding operation, since the lower test terminals 33 are always directly connected through the selector switch 28 to the circuit which is to be grounded.

By turning control handle 141 clockwise to "close" position, rod 142 and arm 149 are turned clockwise to close break 144 in control circuit 70. Irregularly shaped body 148 is moved counterclockwise by spring 152 and actuates rod 154 so that it lies under trip latch 111 to block its movement to render it nontrip free except for the effect of cam interlock 82, 83. Cam interlock 82, 83 will, if the grounding contacts are closed prior to elevation of the grounding and testing device into the cubicle, rotate arm 121 clockwise and elevate the piston like member 153, thereby rotating irregularly shaped body 148 clockwise to withdraw rod 154 from under trip latch 111. Upon further clockwise rotation of arm 121, plate 120, and arm 116 rotate counterclockwise, thereby applying a force to spring biased probe 115 which in turn trips latch 111 to release roller 105. Spring 91 moves overcenter toggle roller 101 upward along surface 102 and rotates bell crank 89 clockwise, and this action trips open the grounding contacts 59, 66.

Manual closing of grounding contacts 59, 66 is initiated by closing pushbutton switch 145 which is connected to a receptacle 147 by a plug and a cable 146. This action completes the circuit of control relay 164 by providing a current flow from the source 163 through contacts 161, 159, conductor 70a, contact 143, conductor 70b, contact 69, conductor 70c, receptacle 147, cable 146, pushbutton switch 145, cable 146, contacts 80, 81, conductor 70d, conductor 70e, conductive metallic strip 133, conductor 70f, coil 164b of relay 164, conductor 70g, contacts 165c, conductor 70h and contacts 160, 162. Relay 164 is actuated upon the flow of current through coil 164b to close contacts 164c, 164d, 164e and 164f thereof. Contacts 164e, 164f are now across the source of power 163 in series with coil 87. Energization of coil 87 actuates plunger 88 to the left to force toggle 97 to its overcenter position which rotates bell crank 89 counterclockwise to close the grounding contacts 59, 66.

Switch 169 closes at the end of the left hand movement of plunger 88. Switch 169 transmits current from the source 163 through contacts 161, 159, conductor 70a, contacts 164c of relay 164, conductor 70f, contacts 172, conductor 70h, coil 165b of relay 165, conductor 70g, contacts 164d of relay 164, conductor 70h and contacts 160, 162. Upon energization of relay 165, armature 165a thereof opens contacts 165c and closes contacts 165d. The opening of contacts 165c of relay 165 deenergizes relay 164 and thereby opens contacts 164e and 164f thereof and deenergizes solenoid 87. If pushbutton 145 is held closed, coil 165b of relay 165 will be maintained energized, holding contacts 165d open thereby maintaining relay 164 and closing coil 87 deenergized. When pushbutton 145 is released, relay 165 will become deenergized and coil 87 cannot be energized again until solenoid operator 61 has been opened, due to action of sliding contact 133.

The selected circuit is then grounded as desired. With the grounding device closed, the control switch handle 141 may be returned to its neutral position and removed, leaving the grounding and testing device positively locked closed on the desired circuit.

To open the grounding contacts 59, 66 thereby ungrounding the test circuit, it is necessary to reinsert the control switch handle 141 in its socket and rotate it counterclockwise to trip position. This action rotates rod 142 counterclockwise and cam 150 on arm 149 rotates body member 148 clockwise which results in the withdrawal of rod 154 from under trip latch 111. Arm 149 in its counterclockwise rotation actuates spring biased rod 155 to rotate plate 120 and arm 116 counterclockwise. Arm 116 actuates probe 115 to trip latch 111, thereby causing the grounding contacts 59, 66 to separate by the force of spring 91 which rotates bell crank 89 clockwise.

If it is desired to reground the same circuit it is only necessary to turn the control switch handle 141 to the "close" position and by means of pushbutton 145 again energize the control circuit. The control circuit operates again as heretofore explained.

If the other (bus or line) circuit is to be grounded, it is necessary to separate the grounding contacts 59, 66, move the elevating interlock 77 to the right or inboard position, insert elevating crank in socket and lower and remove the grounding and testing device from the cubicle. With the selector switch handle 41 change position of selector switch contact 45 and then by the original procedure ground that circuit.

*Phasing out, current or potential test*

This grounding and testing device can be used, after proper settings of the selector switch contact 45 and the interlocks, for phasing out, current or high potential testing.

With the grounding and testing device out of the cubicle or cell, the selector switch movable contact 45 must be moved to line position and the handle 41 removed from socket 42. The key in interlock 40 is moved to extend the bolt 68 to lock the selector switch contact 45 in line position and also to open the grounding closing control circuit 70 by contact bar 69, thus making it impossible to close the grounding contacts during potential phasing out or high potential tests. With the bolt 68 of interlock 40 in extended position, the key may be removed and the grounding and testing device raised into position in the test cubicle. In the raised position the finger contacts 65 ground the framework 25 of the grounding and testing device for additional safety. Cover 35 may be unlocked by the key being inserted in interlock 39, whereby the key is captured in the interlock. The cover may then be raised to expose studs 32 for current, high potential or phasing out tests.

Cover 36 may be opened by removal of the padlock, thereby exposing the bus terminal for the current, high potential or phasing out test.

Although but one embodiment of the present invention has been illustrated and described, it will be apparent to those skilled in the art that various changes and modifications may be made therein without departing from the spirit of the invention or from the scope of the appended claims.

It is claimed and desired to secure by Letters Patent:

1. In combination, an electric circuit, two switches each controlling said circuit and each having a movable circuit controlling contact member, mechanisms for individually actuating the movable contact member of each of said switches to circuit controlling positions, and means for simultaneously locking said movable circuit controlling contact member of one of said switches in a circuit controlling position and preventing the actuation of the mechanism for moving the other of said movable contact members.

2. In combination, an electric circuit, two switches each controlling said circuit and each having a movable circuit controlling contact member, a mechanism for actuating the movable contact member of one of said switches to a circuit controlling position, an electrically operated mechanism for actuating the movable contact member of the other of said switches to a circuit controlling position, a source of power for energizing said electrically operated mechanism, a third switch for controlling said source of power, and means for simultaneously locking said one of said switches in a predetermined position and opening said third switch to prevent the energization of said electrically operated mechanism.

3. In combination, an electric circuit having a pair of terminals, a grounding switch comprising a movable contact and a stationary contact, a selector switch comprising a movable contact electrically connected to said grounding switch, a mechanism for actuating the movable contact of said selector switch from one of said terminals to the other of said terminals, an electrically operated mechanism for actuating said movable contact of said grounding switch from open position to a closed position, a source of power for energizing said electrically operated mechanism, a switch for controlling said source of power, and an interlock for simultaneously locking said selector switch movable contact in contact closed position with one of said terminals and opening said control switch for said source of power to prohibit the actuation of said grounding switch to closed position.

4. In combination, a cubicle, an electric circuit having terminals in said cubicle, an auxiliary source of power in said cubicle, a device for insertion in said cubicle in said power circuit for grounding and testing said electric circuit, said device comprising a grounding switch embodying a movable contact, a selector switch electrically connected with said grounding contact in grounding contact closed position comprising a movable contact arranged to selectively contact said terminals, means for actuating said selector switch, electrical means for actuating said grounding switch from open to closed position, a control circuit in series with said electrical means and said auxiliary source of power, a switch arranged in said control circuit, and an interlock for simultaneously locking said selector switch movable contact in closed position with one of said terminals and for opening said switch in said control circuit to prohibit the actuation of said grounding contact to closed position.

5. A grounding and testing device comprising in combination, a frame, a bus terminal and a line terminal, a test terminal connected to said bus terminal, a hinged cover for said test terminal, a grounding switch connected to said frame and comprising a movable contact, a selector switch electrically connected to said grounding contact in grounding contact closed position comprising a movable contact arranged to selectively contact said bus and line terminals, means for actuating said selector switch, electrical means for actuating said grounding switch from open to closed position, a control circuit in series with said electrical means, an auxiliary source of power in series with said control circuit, a switch arranged in said control circuit, a key interlock for controlling test terminal cover, a key interlock for controlling the movement of said selector switch movable contact, and a common key for use in said interlocks, said key when used in said selector switch interlock to lock said movable contact of said selector switch in line position opening said switch in said control circuit to prevent actuation of said grounding contacts to closed position, said key then being removable from said selector switch interlock for use in said cover interlock to open said cover and expose said test terminal for test purposes.

6. A grounding and testing device comprising in combination, a frame, a bus terminal and a line terminal, a test terminal connected to said bus terminal, a hinged cover for said test terminal, a grounding switch connected to said frame and comprising a movable contact, a selector switch electrically connected to said grounding contact in grounding contact closed position comprising a movable contact arranged to selectively contact said bus and line terminals, means for actuating said selector switch, electrical means for actuating said grounding switch from open to closed position, a control circuit in series with said electrical means, an auxiliary source of power in series with said control circuit, a switch arranged in said control circuit, a key interlock for controlling the cover over said test terminal, a key interlock for controlling the movement of said selector switch movable contact, and a common key for use in said interlocks, said key when used in said selector switch interlock to lock said movable contact of said selector switch in line position opening said switch in said control circuit to prevent actuation of said grounding contacts to closed position, said key then being removable from said selector switch interlock for use in said cover interlock to open said cover and expose said bus terminal for test purposes and being captured in said cover to prevent removal therefrom except when said cover is locked closed.

7. A grounding and testing device comprising in combination, a frame, a bus terminal and a line terminal, a test terminal connected to said bus terminal, a hinged cover for said test terminal, a grounding switch connected to said frame and comprising a movable contact, a selector switch electrically connected to said grounding contact in grounding contact closed position comprising a movable contact arranged to selectively contact said bus and line terminals, means for actuating said selector switch, electrical means for actuating said grounding switch from open to closed position, a control circuit in series with said electrical means, an auxiliary source of power in series with said control circuit, a switch arranged in said control circuit, a key interlock for controlling the cover over said test terminal, a key interlock for controlling said selector switch, and a common key for use in said interlocks, said key when used in said selector switch interlock with said movable contact of said selector switch in bus position closing the switch in said control circuit to permit the actuation of said grounding contact to closed position, said key then being captured in said selector switch interlock to prevent its use in said cover interlock to prohibit the exposure of said test terminal for test purposes.

8. In combination, a cubicle, an electric circuit having terminals in said cubicle, a grounding and testing device for insertion in said cubicle comprising in combination, a frame, a bus terminal and a line terminal for contacting said electric circuit terminals, a grounding switch connected to said frame and comprising a movable contact, a selector switch electrically connected to said grounding contact in grounding contact closed position comprising a movable contact arranged to selectively contact said bus and line terminals, mechanisms for individually actuating the movable contact member of each of said switches to circuit controlling positions for grounding and test purposes, a mechanism for elevating and lowering said test device in said cubicle, an interlock mechanism associated with said grounding switch for prohibiting the raising or lowering of the test device into the cubicle when the grounding switch is in closed position.

9. A grounding and testing device comprising in combination, a frame, a bus terminal and a line terminal, a test terminal connected to said bus terminal, a hinged cover for said test terminal, a grounding switch connected to said frame and comprising a movable contact, a selector switch electrically connected to said grounding contact in grounding contact closed position comprising a movable contact arranged to selectively contact said terminals, means for actuating said selector switch, electrical means for actuating said grounding switch from open to closed position, a control circuit in series with said electrical means, an auxiliary source of power in series with said control circuit, a switch arranged in said control circuit, a key interlock for controlling the cover over said test terminal, a key interlock for controlling the movement of said selector switch movable contact, a common key for use in said interlocks, said key when used in said selector switch interlock to lock said movable contact of said selector switch in line position opening said switch in said control circuit to prevent actuation of said grounding contact to closed position, said key then being removable from said selector switch interlock for use in said cover interlock to unlock said cover to expose said test terminal for test purposes, and another interlock connected to said grounding switch for locking closed said cover even though said key opened said cover interlock when the grounding switch is in closed position.

10. A grounding and testing device adapted for insertion into a cubicle comprising a bus terminal, a line terminal, a double throw type selector switch comprising a movable contact adapted to be selectively connected to said bus terminal and line terminal, means for operating said selector switch, a single throw grounding switch comprising a movable contact for grounding said movable contact of said selector switch, a grounding switch opening spring, means including a solenoid for closing said grounding switch and loading said spring, tripping means for causing said spring to open said grounding switch, a first auxiliary switch for energizing said solenoid, a second auxiliary switch precluding in the open position thereof said solenoid from being energized, a manually operable control element having a pair of extreme positions and adapted to close said second auxiliary switch in one of said pair of extreme positions, and interlocking means under the control of said element for precluding said tripping means from becoming effective unless said element is in the other of said pair of extreme positions.

JOHN F. CHIPMAN.

References Cited in the file of this patent

UNITED STATES PATENTS

| Number | Name | Date |
|---|---|---|
| 2,353,518 | Specht | July 11, 1944 |

OTHER REFERENCES

A New Grounding and Testing Device for Metal-Clad Switchgear-AIEE Technical paper 50-60, December 1949, H. Krida and E. T. McCurry.